US010387420B2

(12) United States Patent
Geisler et al.

(10) Patent No.: US 10,387,420 B2
(45) Date of Patent: Aug. 20, 2019

(54) DYNAMIC MODIFICATION OF DATA SET GENERATION DEPTH

(71) Applicant: International Business Machines Corporation, Armonk, NY (US)

(72) Inventors: Trevor A. Geisler, Tucson, AZ (US); David C. Reed, Tucson, AZ (US); Thomas C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 587 days.

(21) Appl. No.: 14/831,061

(22) Filed: Aug. 20, 2015

(65) Prior Publication Data

US 2017/0052992 A1 Feb. 23, 2017

(51) Int. Cl.
*G06F 16/25* (2019.01)
*G06F 16/2455* (2019.01)

(52) U.S. Cl.
CPC ........ *G06F 16/24554* (2019.01); *G06F 16/25* (2019.01)

(58) Field of Classification Search
CPC ......... G06F 17/30486; G06F 16/24554; G06F 16/25
See application file for complete search history.

(56) References Cited

U.S. PATENT DOCUMENTS 6,965,700 B2 11/2005 Pearlman et al.
7,870,491 B1 * 1/2011 Henderson ............ G06F 9/4446 715/745
8,838,523 B2 9/2014 Stergiou et al.
8,862,858 B1 * 10/2014 Ozdemir ............ G06F 11/1435 711/206
8,909,592 B2 12/2014 Stergiou et al.
2005/0131964 A1 * 6/2005 Saxena ..................... G06F 8/71
2008/0256140 A1 * 10/2008 Lazzaro .............. G06F 11/1451
2012/0254175 A1 * 10/2012 Horowitz .......... G06F 17/30584 707/737
2013/0013561 A1 * 1/2013 Chan ................ G06F 17/30132 707/636

(Continued)

OTHER PUBLICATIONS

Winnard, K. et al.; "DFSMShsm: Managing PDSE V3 Data Sets"; IBM Corporation, www.ibm,com/redbooks/redp5160; Apr. 2015.

*Primary Examiner* — Richard L Bowen
(74) *Attorney, Agent, or Firm* — Nelson and Nelson; Daniel P. Nelson; Alexis V. Nelson

(57) ABSTRACT

A method for dynamically modifying data set generation depth is disclosed herein. In one embodiment, such a method includes providing a data set comprising one or more data elements. For each data element, a maximum generations number is designated that specifies a maximum number of generations of the data element to retain in the data set. The method monitors an access rate (e.g., creation rate, update rate, etc.) for each data element and dynamically alters, for each data element, the maximum generations number in accordance with the data element's access rate. In certain embodiments, the maximum generations number of a data element is increased as its access rate increases. Similarly, the maximum generations number of a data element may be decreased as its access rate decreases. A corresponding system and computer program product are also disclosed.

20 Claims, 5 Drawing Sheets

(56) References Cited

U.S. PATENT DOCUMENTS

| | | | | |
|---|---|---|---|---|
| 2013/0227714 | A1* | 8/2013 | Gula | G06F 21/64 726/32 |
| 2014/0236910 | A1* | 8/2014 | Owuor | G06F 17/30345 707/694 |
| 2014/0372384 | A1* | 12/2014 | Long | G06F 17/30289 707/679 |
| 2016/0253373 | A1* | 9/2016 | Fryc | G06F 17/3023 707/695 |
| 2017/0255589 | A1* | 9/2017 | Barber | G06F 15/167 |

* cited by examiner

DYNAMIC MODIFICATION OF DATA SET GENERATION DEPTH

BACKGROUND

Field of the Invention

This invention relates to systems and methods for dynamically modifying data set generation depth in PDSE data sets.

Background of the Invention

In the z/OS operating system, PDSE (partitioned data set extended) data sets are used to simply and efficiently organize related groups of sequential files, also referred as "members." Current versions of PDSE data sets may support multiple levels, or generations, of members. Using this feature, when a member is changed, a new member may be created and the older version of the member may be retained, up to a specified number of generations. This feature advantageously enables recent changes to a member to be reversed. This feature also allows multiple generations of a member to be retained for archival reasons. The retained generations may be structured in a first in, first out (FIFO) configuration, such that an oldest generation is discarded when the retained generation limit is reached.

PDSE data sets may be configured to store previous versions of individual members up to a predefined maximum generational limit. Under the current PDSE implementation which uses a set maximum generations parameter, frequently updated members are constantly expunging viable older versions, while infrequently updated members retain previous versions far past their usefulness. Simply increasing the maximum generations parameter is often not a viable option due to the increase in space consumption. Using this option, members that are infrequently updated will still store as many generations as those that are frequently updated. This represents an inefficient use of space in a PDSE data set.

In view of the foregoing, systems and methods are needed to dynamically modify generation depth in PDSE data sets. Further needed are systems and methods to retain additional generations for members that are updated frequently, while retaining fewer generation for members that are updated less frequently. Ideally, such systems and methods will more efficiently utilize space in PDSE data sets.

SUMMARY

The invention has been developed in response to the present state of the art and, in particular, in response to the problems and needs in the art that have not yet been fully solved by currently available systems and methods. Accordingly, the invention has been developed to provide systems and methods to dynamically modify generation depth in PDSE or similar data sets. The features and advantages of the invention will become more fully apparent from the following description and appended claims, or may be learned by practice of the invention as set forth hereinafter.

Consistent with the foregoing, a method for dynamically modifying data set generation depth is disclosed herein. In one embodiment, such a method includes providing a data set comprising one or more data elements. In certain embodiments, the data set is a partitioned data set extended (PDSE) data set, and the data elements are "members" within the PDSE data set. For each data element, a maximum generations number is designated that specifies a maximum number of generations of the data element to retain in the data set. The method monitors an access rate (e.g., creation rate, update rate, etc.) for each data element and dynamically alters, for each data element, the maximum generations number in accordance with the data element's access rate. In certain embodiments, the maximum generations number of a data element is increased as its access rate increases. Similarly, the maximum generations number of a data element may be decreased as its access rate decreases.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
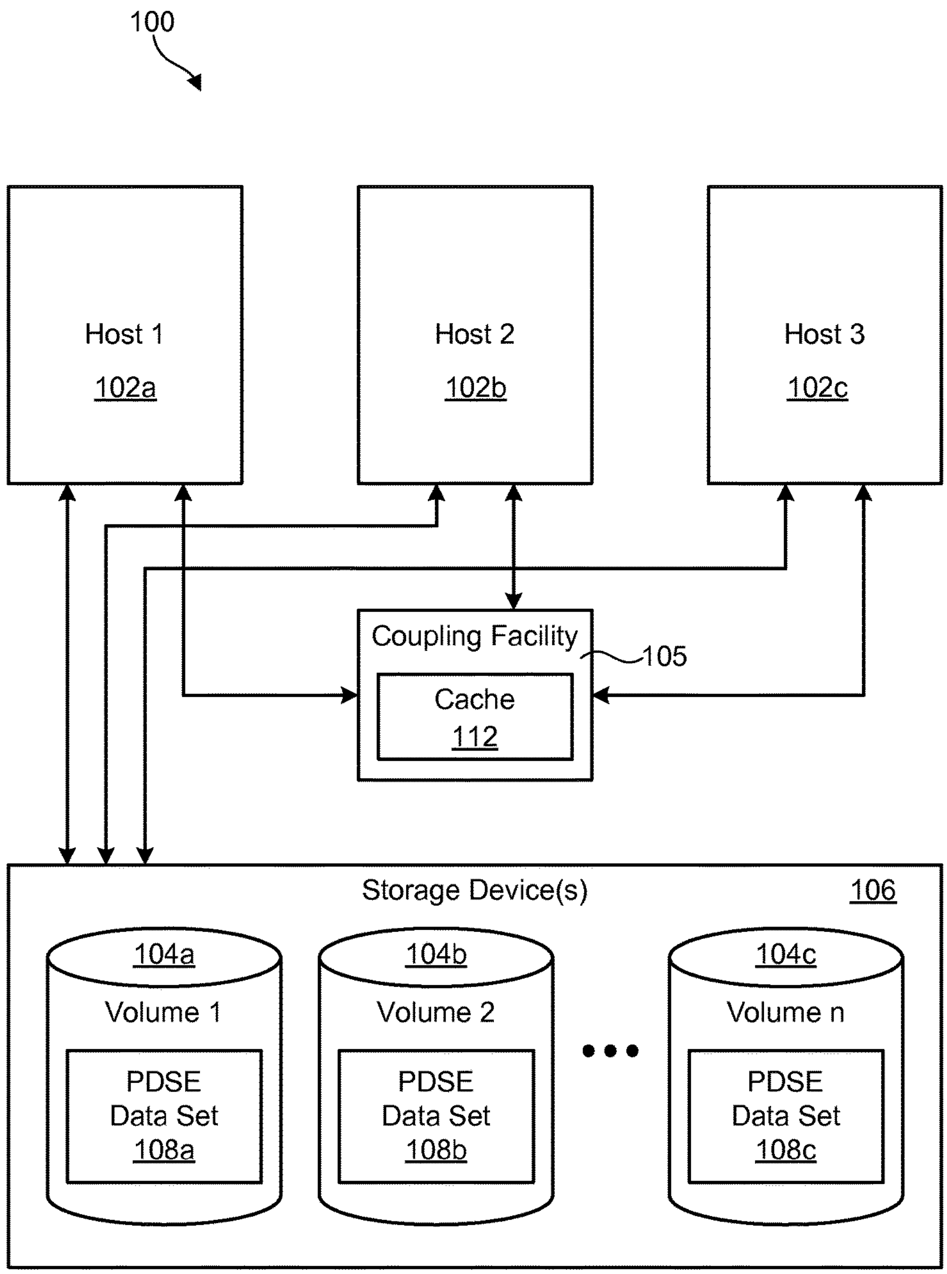
FIG. 1 is a high-level block diagram showing one example of an environment in which a system and method in accordance with the invention may operate.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer-readable program instructions thereon for causing a processor to carry out aspects of the present invention.

The computer-readable storage medium may be a tangible device that can retain and store instructions for use by an instruction execution device. The computer-readable storage medium may be, for example, but is not limited to, an electronic storage system, a magnetic storage system, an optical storage system, an electromagnetic storage system, a semiconductor storage system, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage system via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one embodiment an environment 100 for implementing a system and method in accordance with the invention is illustrated. In the illustrated embodiment, the environment 100 is an IBM Sysplex® environment 100. Nevertheless, embodiments of the invention are not limited to operating within an IBM Sysplex® environment 100 but may include any comparable or analogous environment, regardless of the manufacturer, product name, or components or component names associated with the environment. Furthermore, any environment that could benefit from one or more embodiments of the invention is deemed to fall within the scope of the invention. Moreover, systems and methods in accordance with the invention may be used in any environment that exhibits the same issues or problems disclosed herein. Such environments are also deemed to fall within the scope of the present invention. Thus, the Sysplex® environment 100 is presented only by way of example and is not intended to be limiting.

A Sysplex® environment 100 may be configured to enable multiple mainframe processors of host systems 102*a-c* to act as a single unit and share the same data, while ensuring data integrity, enabling resource sharing, and performing workload balancing. For example, the host systems 102*a-c* may share data stored in one or more storage device (e.g., DASD) volumes 104*a-c*. A coupling facility 105 may include computer hardware and/or software that enable the host systems 102*a-c* to share the same data. In certain embodiments, the coupling facility 105 may include cache 112 to store information shared among the attached host systems 102*a-c*.

As mentioned, the host systems 102*a-c* may share data stored in one or more volumes 104*a-c* stored on one or more storage devices 106. The storage devices 106 may include single disk drives or solid state drive s, arrays of disk drives or solid state drives, or other storage devices 106 known to those of skill in the art. The volumes 104*a-c* may reside on a single storage device 106 or span multiple storage devices 106.

Figure 2:
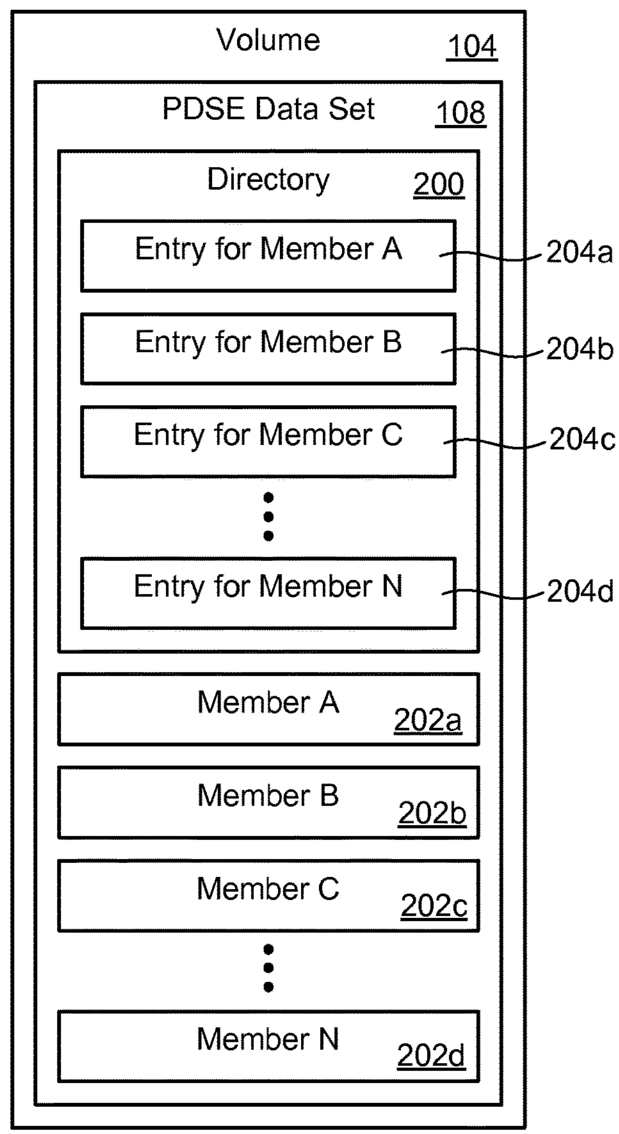
FIG. 2 is a high-level block diagram showing an organization of a PDSE data set.

Referring to FIG. 2, while continuing to refer generally to FIG. 1, in selected embodiments, each of the volumes 104*a-c* may store one or more data sets 108*a-c*. In certain embodiments, these data sets 108*a-c* include PDSE data sets 108*a-c*. As previously explained, a PDSE (partitioned data set extended) data set 108 may be used to simply and efficiently organize related groups of sequential data elements, also referred to herein as files or "members." As also explained, a PDSE data set 108 may support multiple levels, or generations, of members. Using this feature, when a member is changed, a new member is created and the older version of the member is retained, up to a specified number of generations. This feature may enable recent changes to a member to be reversed. This feature may also enable multiple generations of a member to be retained for archival reasons. The retained generations may be structured in a first in, first out (FIFO) configuration, such that an oldest generation is discarded when the retained generation limit is reached.

As shown in FIG. 2, a PDSE data set 108 may include a directory 200 and one or more members 202*a-d*. Each member 202 may contain sequential data and have a name up to a specified number of characters. Each member 202 may include one or more generations, meaning that previous versions of the member 202 may be retained and stored in the PDSE data set 108. The directory 200 may contain entries 204*a-d* for the members 202 in the PDSE data set 108. Each entry 204 may include the name of the corresponding member 202, a pointer to the member 202, and other attributes associated with the member 202.

As previously mentioned, conventional PDSE data sets 108 may be configured to store previous versions of individual members 202 up to a predefined maximum generational limit. This maximum generational limit is set for the PDSE data set 108 as a whole and used for all member of the data set 108. Using this maximum generational limit, frequently updated members constantly expunge viable older versions, while infrequently updated members retain previous versions long past their usefulness. As was also previously explained, simply increasing the maximum generational limit for the data set 108 is often not a viable option due to the significant increase in space consumption. Furthermore, members that are infrequently updated will still store as many generations as those that are frequently updated. This represents an inefficient use of space in a PDSE data set 108.

Figure 3:
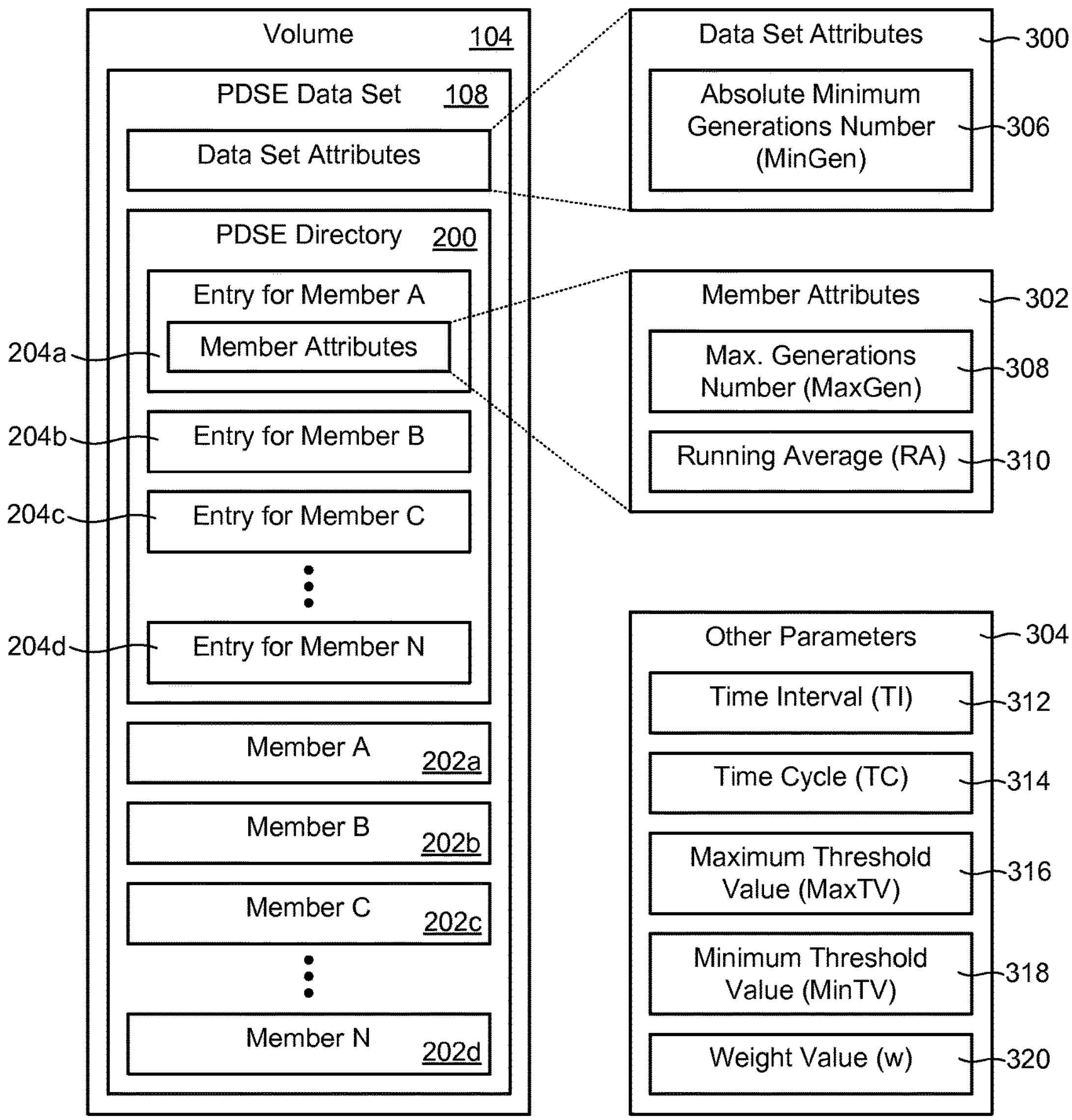
FIG. 3 is a high-level block diagram showing various attributes and parameters for use by a system and method in accordance with the invention.

Referring to FIG. 3, in certain embodiments in accordance with the invention, a PDSE data set 108 and associated access method may be modified to more efficiently use storage space. Using the improved PDSE data set 108 and associated access method, more generations may be retained for members 202 that are updated more frequently, while fewer generations may be retained for members 202 that are updated less frequently. This may be accomplished by establishing a maximum generations number 308 for each member 202 in the data set 108, and dynamically adjusting the maximum generations number 308 in accordance with the access rate to the member 202. The magnitude of the maximum generations number 308 may be referred to as "generation depth."

In order to implement an improved PDSE data set 108 and associated access method, various attributes 300, 302 may be established and maintained in the data set 108. For example, instead of using a single maximum generational limit for the entire data set 108, a maximum generations number 308 (MaxGen) may be established and maintained for each member 202 in the data set 108. Similarly, a running average 310 (RA) of the member creation rate (i.e., the frequency that a member 202 is changed or updated) may be calculated and stored for each member 202 in the data set 108. This running average 310 may change as the access rate to a member 202 changes. The maximum generations number 308 for a member 202 may be adjusted based on the running average 310. For example, as the running average 310 increases, the maximum generations number 308 for the member 202 may be increased. Similarly, as the running average 310 decreases, the maximum generations number 308 may be decreased. The maximum generations number 308 and running average 310 for a member 202 may, in certain embodiments, be stored in member attributes 302 associated with the member 202. The manner in which the maximum generations number 308 and running average 310 are calculated and utilized will be discussed in more detail hereafter.

In certain embodiments, an absolute minimum generations number 306 (MinGen) may be established and set for the data set 108 as a whole. In certain embodiments, the absolute minimum generations number 306 is stored in the PDSE data set 108, such as in data set attributes 300 applicable to all data set members 202. This absolute minimum generations number 306 may specify a minimum number of generations to retain for a member 202 regardless of how frequently the member 202 is updated. This will ensure that a minimum number of generations is retained for each member 202.

Other parameters 304 may also be used to dynamically adjust the maximum generations number 308 for each member 202. In certain embodiments, these parameters 304 are calculated and/or stored by a host system 102 that executes an algorithm to dynamically adjust the maximum generations number 308 for each member 202. For example, a time interval 312 (TI) and time cycle 314 (TC) may be established to calculate the running average 310. A maximum threshold value 316 (MaxTV) and minimum threshold value 318 (MinTV) may also be calculated/established. These threshold values 316, 318 may designate when a maximum generations number 308 should be increased or decreased. For example, if the running average 310 for a member 202 rises above the maximum threshold value 316, the maximum generations number 308 for the member 202 may be increased to ensure that a larger number of generations for the member 202 are retained. Similarly, if the running average 310 for a member 202 falls below the minimum threshold value 318, the maximum generations number 308 for the member 202 may be decreased so that a smaller number of generations for the member 202 are retained. The manner in which the maximum threshold value 316 and minimum threshold value 318 are calculated will be discussed in more detail hereafter.

A weight value 320 (w) may also be established. The weight value 320 may be used to ensure that changes to the running average 310 are somewhat normalized. For example, the weight value 320 may help to ensure that the maximum generations number 308 will not change, or significantly change, in response to temporary but significant fluctuations in the access rate to a member 202. The manner in which the weight value 320 may be used will be discussed in more detail hereafter.

Figure 4:
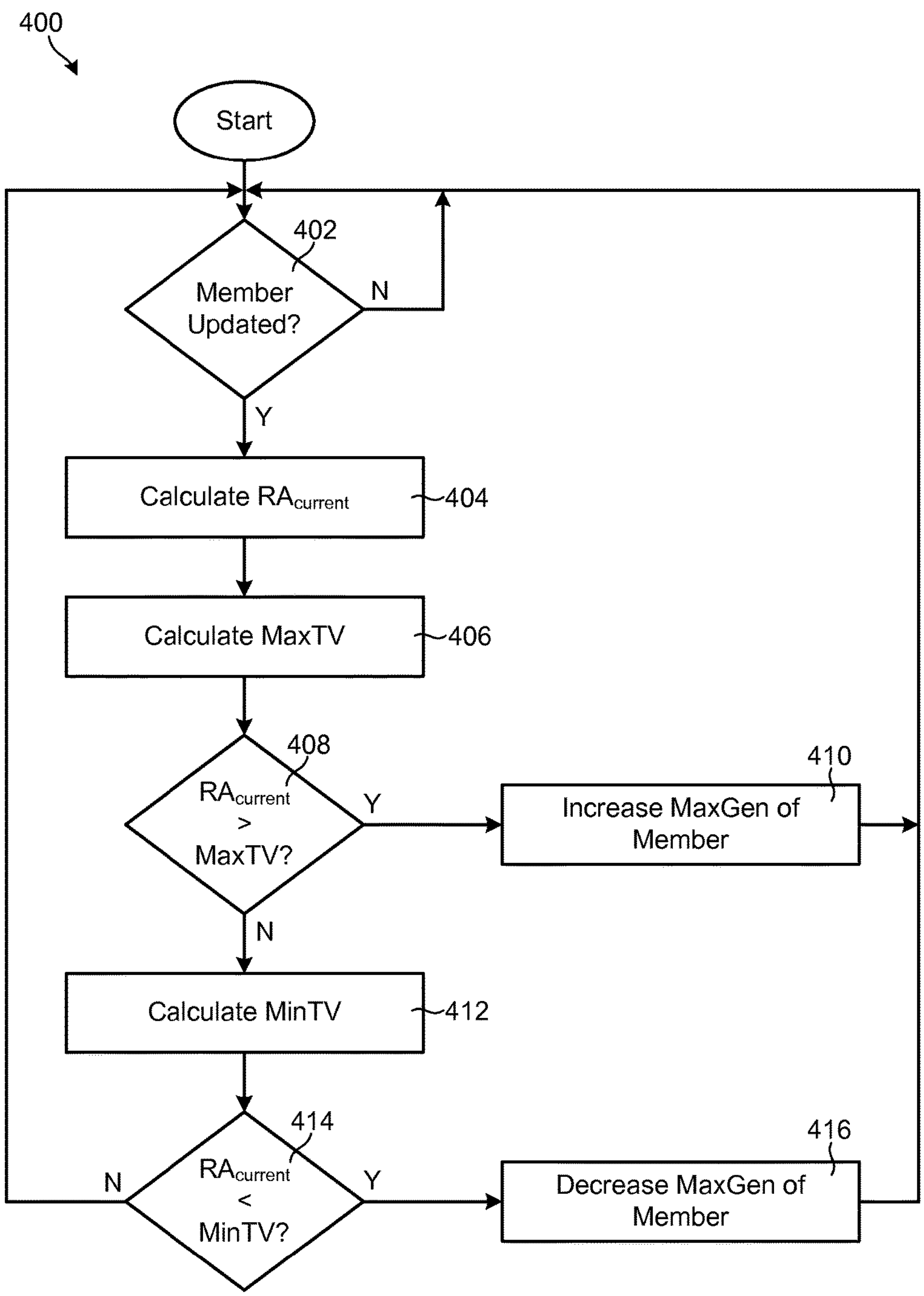
FIG. 4 shows one embodiment of a method for dynamically modifying generation depth in PDSE or similar data sets, using an initial running average.

Referring to FIG. 4, one embodiment of a method 400 for dynamically modifying generation depth in a PDSE or similar data set is illustrated. As shown, the method 400 initially determines 402 whether a member 202 of the PDSE data set 108 has been updated. If a member 202 has been updated, the method 400 calculates 404 the current running average 310 (RA) for the member 202. This may be accomplished, for example, using the following equation:

$$RA_{current}=(TI/(\text{Current Update Time}-\text{Previous Update Time}))*(TC/TI)$$

where TI is the time interval 312 and TC is the time cycle 314. For example, if the time interval 312 is one hour, the time cycle 314 is one day (24 hours), the New Update Time for the member 202 is 7:30 PM, and the Previous Update Time for the same member 202 is 7:00 PM, the running average 310 (i.e., updates per time cycle 314) associated with the member 202 would be calculated as follows:

$$RA_{current} = (TI/(\text{Current Update Time} - \text{Previous Update Time})) * (TC/TI)$$
$$= 1\ \text{hour}/(7{:}30\text{-}7{:}00)) * (24\ \text{hours}/1\ \text{hour})$$
$$= 48$$

The method 400 may then calculate the maximum threshold value 316 (MaxTV) such as using the following equation:

maxTV=(MaxGen)/(TC/TI)

where MaxGen is the current maximum generations number 308 associated with the member 202. Continuing with the previous example, if the maximum generations number 308 for the member 202 is initially four, the maximum threshold value 316 would be calculated as follows:

$$maxTV = (MaxGen)/(TC/TI)$$
$$= 4/(24\ \text{hours}/1\ \text{hour})$$
$$= 0.1667$$

The running average 310 may then be compared 408 with the maximum threshold value 316. If the running average 310 is greater than the maximum threshold value 316, the maximum generations number 308 may be increased 410. In certain embodiments, the maximum generations number 308 is doubled each time it is increased. Continuing with the example above, because the running average (48) is clearly larger than the maximum threshold value (0.1667), the maximum generations number 308 associated with the member 202 would be doubled from four to eight. Because doubling the maximum generations number 308 will cause the maximum generations number 308 to grow exponentially, the maximum threshold value 316 will also grow exponentially due to its linear relationship with the maximum generations number 308. Assuming the running average 310 of the member 202 stays substantially constant, the maximum threshold value 316 will continue to grow as updates to the member 202 occur until it exceeds the running average 310. This will cause the maximum generations number 308 to reach a point of equilibrium where it stops growing (assuming the running average 310 doesn't change significantly).

If, at step 408, the running average 310 is not greater than the maximum threshold value 316, the method 400 calculates 412 the minimum threshold value 318. In certain embodiments, the minimum threshold value 318 is a fraction of the maximum threshold value 316, such as ¼ of the maximum threshold value 316, as shown by the following equation:

minTV=(¼)*maxTV

If, at step 414, the running average 310 is less than the minimum threshold value 318, the method 400 decreases 416 the maximum generations number 308, such as by halving the maximum generations number 308. If the running average 310 is not less than the minimum threshold value 318, the method 400 returns to the top where it waits 402 for the member 202 to be updated again. As long as the running average 310 stays between the maximum threshold value 316 and the minimum threshold value 318, the maximum generations number 308 will achieve an equilibrium where it does not change.

Figure 5:
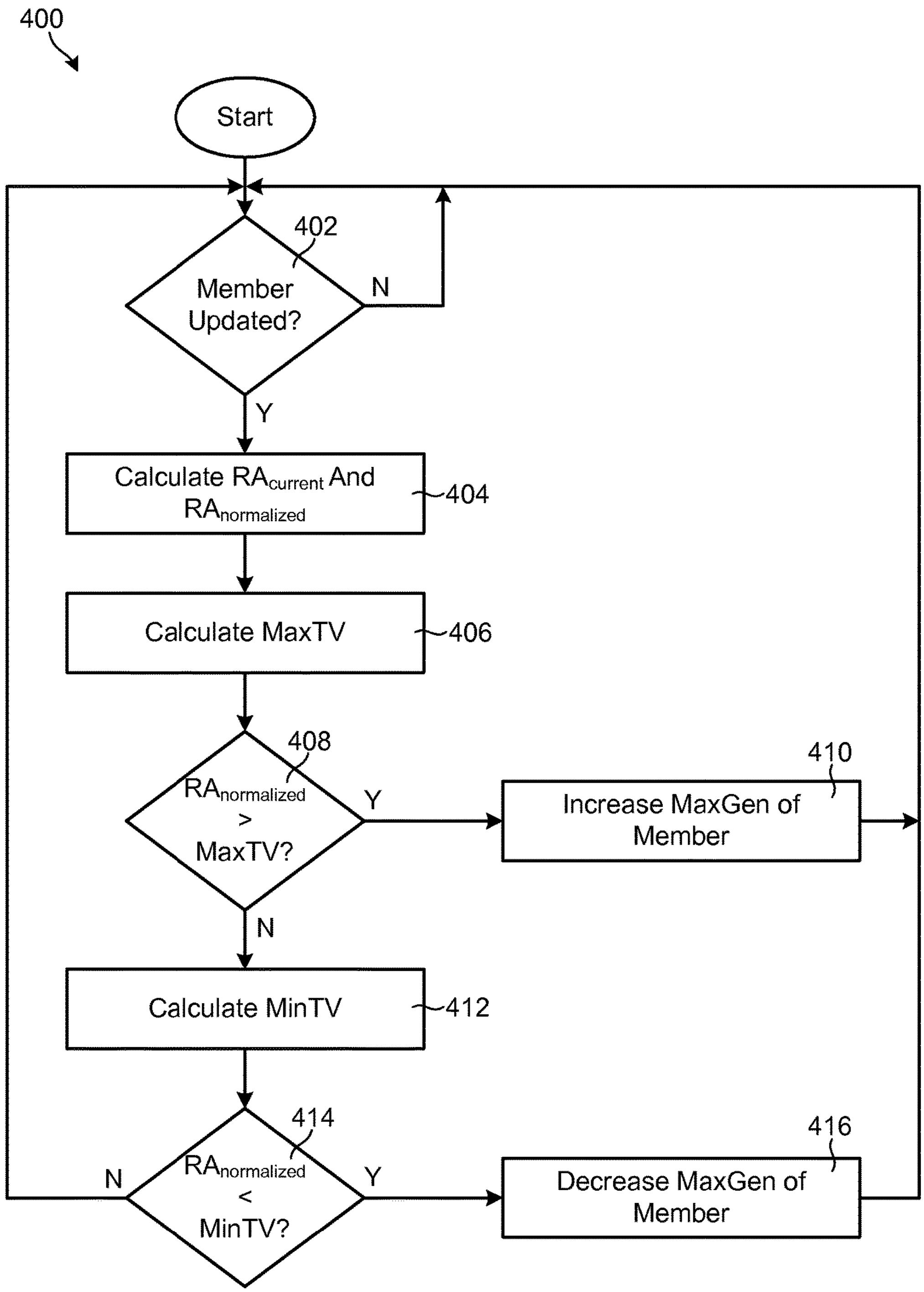
FIG. 5 shows one embodiment of a method for dynamically modifying generation depth in PDSE or similar data sets, using a normalized running average.

Referring to FIG. 5, for subsequent member updates and comparisons with the maximum threshold value 316 and minimum threshold value 318, the weight value 320 previously discussed may be taken into account. The weight value 320 may be used to normalize the running average 310. After the running average 310 ($RA_{current}$) is initially calculated using the equations set forth above, the following algorithms may be used to determine whether the maximum generations number 308 is increased or decreased:

$RA_{current}$=(TI/(Current Update Time−Previous Update Time))*(TC/TI)

$RA_{normalized}=(w*RA_{previous}+RA_{current})/(w+1)$

IF $RA_{normalized}$>maxTV THEN MaxGen=MaxGen*2 AND $RA_{previous}=(w*RA_{previous}+RA_{current})/(w+1)$ IF $RA_{normalized}$<minTV THEN MaxGen=MaxGen/2 AND $RA_{previous}=(w*RA_{previous}+RA_{current})/(w+1)$ Although particular reference has been made herein to PDSE data sets 108, the systems and methods disclosed herein may be equally applicable to other types of data sets with similar characteristic. For example, any type of data set 108 that stores multiple data elements (e.g., members, files, etc.) as well as a number of previous generations of the data elements may beneficially utilize the systems and methods disclosed herein to more efficiently utilize storage space. Thus, the systems and methods disclosed herein are not limited to PDSE data sets 108.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for dynamically modifying data set generation depth, the method comprising:

storing, within a volume, a data set comprising a directory and one or more data elements;

maintaining, in the directory for each data element, an attribute storing a maximum generations number, the maximum generations number specifying a maximum number of generations of the data element to retain in the data set;

maintaining, in the directory for each data element, a running average indicating an average creation rate for each data element;

designating, in the data set, a maximum threshold value indicating a level at which the running average will trigger an increase of the maximum generations number;

designating, in the data set, a minimum threshold value indicating a level at which the running average will trigger a decrease of the maximum generations number; and dynamically altering, for each data element, the maximum generations number in accordance with the data element's running average, the maximum threshold value, and the minimum threshold value.

2. The method of claim 1, wherein the data set is a partitioned data set extended (PDSE) data set, and the data elements are members within the PDSE data set.

3. The method of claim 1, further comprising increasing the maximum generations number of a data element as its running average increases.

4. The method of claim 1, further comprising decreasing the maximum generations number of a data element as its running average decreases.

5. The method of claim 1, wherein the running average is calculated based on a designated time interval and time cycle.

6. The method of claim 5, wherein the time interval and time cycle are stored within the data set.

7. The method of claim 5, wherein dynamically altering comprises:

doubling the maximum generations number in the event the running average exceeds the maximum threshold value; and halving the maximum generations number in the event the running average falls below the minimum threshold value.

8. A computer program product for dynamically modifying data set generation depth, the computer program product comprising a computer-readable medium having computer-usable program code embodied therein, the computer-usable program code configured to perform the following when executed by at least one processor:

store, within a volume, a data set comprising a directory and one or more data elements;

maintain, in the directory for each data element, an attribute storing a maximum generations number, the maximum generations number specifying a maximum number of generations of the data element to retain in the data set;

maintain, in the directory for each data element, a running average indicating an average creation rate for each data element;

designate, in the data set, a maximum threshold value indicating a level at which the running average will trigger an increase of the maximum generations number;

designate, in the data set, a minimum threshold value indicating a level at which the running average will trigger a decrease of the maximum generations number; and dynamically alter, for each data element, the maximum generations number in accordance with the data element's running average, the maximum threshold value, and the minimum threshold value.

9. The computer program product of claim 8, wherein the data set is a partitioned data set extended (PDSE) data set, and the data elements are members within the PDSE data set.

10. The computer program product of claim 8, wherein the computer-usable program code is further configured to increase the maximum generations number of a data element as its running average increases.

11. The computer program product of claim 8, wherein the computer-usable program code is further configured to decrease the maximum generations number of a data element as its running average decreases.

12. The computer program product of claim 8, wherein the running average is calculated based on a designated time interval and time cycle.

13. The computer program product of claim 12, wherein the time interval and time cycle are stored within the data set.

14. The computer program product of claim 12, wherein dynamically altering comprises:

doubling the maximum generations number in the event the running average exceeds the maximum threshold value; and halving the maximum generations number in the event the running average falls below the minimum threshold value.

15. A system for dynamically modifying data set generation depth, the system comprising:

at least one processor;

at least one memory device operably coupled to the at least one processor and storing instructions for execution on the at least one processor, the instructions causing the at least one processor to:

store, within a volume, a data set comprising a directory and one or more data elements;

maintain, in the directory for each data element, an attribute storing a maximum generations number, the maximum generations number specifying a maximum number of generations of the data element to retain in the data set;

maintain, in the directory for each data element, a running average indicating an average creation rate for each data element;

designate, in the data set, a maximum threshold value indicating a level at which the running average will trigger an increase of the maximum generations number;

designate, in the data set, a minimum threshold value indicating a level at which the running average will trigger a decrease of the maximum generations number; and dynamically alter, for each data element, the maximum generations number in accordance with the data element's running average, the maximum threshold value, and the minimum threshold value.

16. The system of claim 15, wherein the data set is a partitioned data set extended (PDSE) data set, and the data elements are members within the PDSE data set.

17. The system of claim 15, wherein the instructions further cause the at least one processor to increase the maximum generations number of a data element as its running average increases.

18. The system of claim 15, wherein the instructions further cause the at least one processor to decrease the maximum generations number of a data element as its running average decreases.

19. The system of claim 15, wherein the running average is calculated based on a designated time interval and time cycle.

20. The system of claim 19, wherein the time interval and time cycle are stored within the data set.

* * * * *